J. R. HAYES.
Apparatus for Compressing and Molding Artificial Fuel.
No. 149,396.           Patented April 7, 1874.
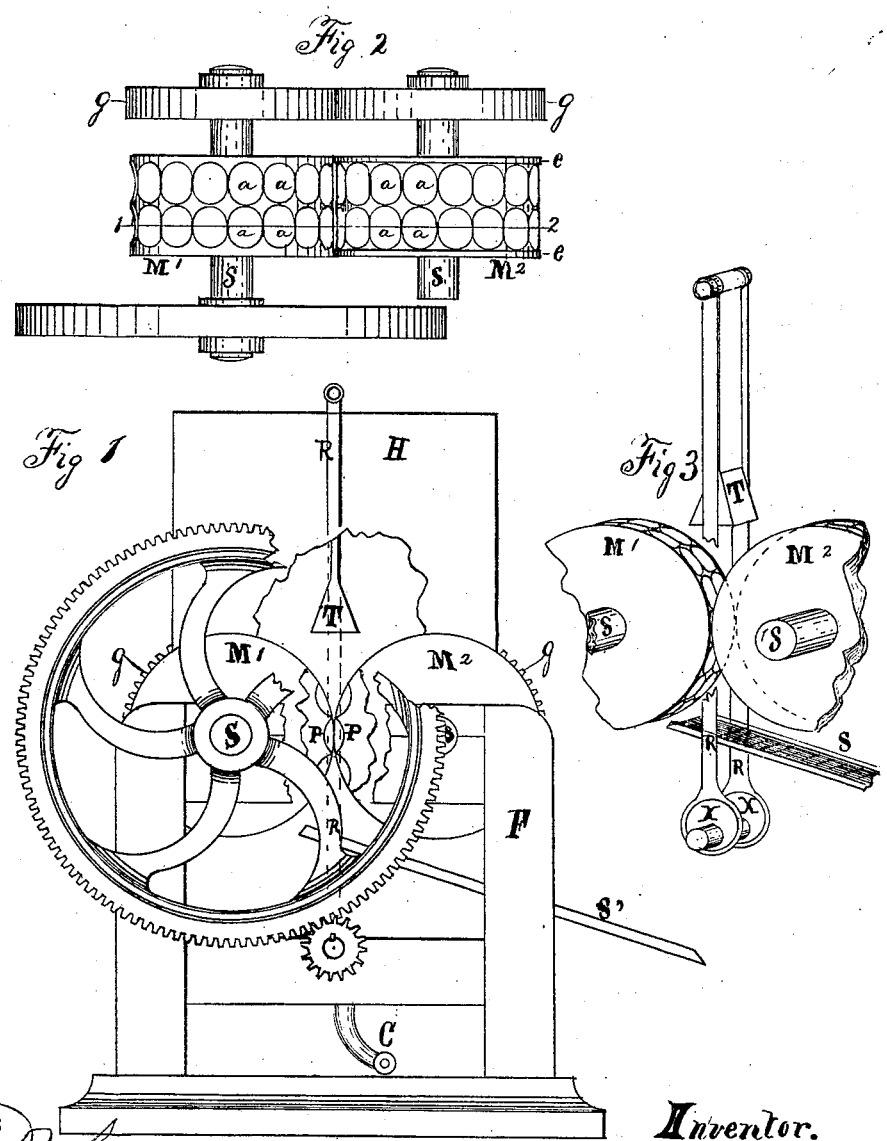

UNITED STATES PATENT OFFICE.

JOSHUA R. HAYES, OF WASHINGTON, DISTRICT OF COLUMBIA, ASSIGNOR OF ONE-HALF HIS RIGHT TO MORRIS MATTSON, OF NEW YORK CITY.

IMPROVEMENT IN APPARATUS FOR COMPRESSING AND MOLDING ARTIFICIAL FUEL.

Specification forming part of Letters Patent No. 149,396, dated April 7, 1874; application filed March 11, 1874.

*To all whom it may concern:*

Be it known that I, JOSHUA R. HAYES, of the city of Washington, District of Columbia, have invented a new and novel Machine for Compressing and Molding Coal-Dust Concrete; and that the following is a description of the same.

The purpose of this invention is a machine to compress and mold coal dust or waste when compounded with materials for adhesion and combustion, but is more especially adapted for the composition prepared in accordance with specification in Letters Patent issued to me March 4, 1873, and numbered 136,375.

Figure 1, view of machine in elevation; Fig. 2, cylinders detached; Fig. 3, tamper in its relation to molding-cylinders.

I construct two cylinders, $M^1 M^2$, cast of iron or other suitable metal, each cylinder resting upon shafts S S, and these shafts adjusted to a frame, F. Upon these cylinders I cast as many dies or cavities of requisite size and form as the face of the cylinders will admit of, $a\ a$. When these cylinders are moved by the gear-wheels $g\ g$, a space of about one-sixteenth of an inch is necessary to be maintained between them in order that the material to be molded shall freely enter the cavities, and be pushed out when in excess. This space is produced by a slight elevation, $e\ e$, on the sides of the cylinder $M^2$. H is the hopper or feeder. In this hopper works the tamper T by the lifting-rods R R, attached to cams or eccentrics $x\ x$, and moved by the gear and crank C. A positive pressing motion equal to the power represented by the gearing is thus produced by the tamper on the contents of the hopper—a condition necessary before the coal-dust concrete can be successfully molded by the cavities in the cylinders.

When the coal-dust concrete is placed in the hopper, and the cylinders revolved by the crank, belt, or pulley wheel, the motion of the cylinders creates suction, and the material to be pressed and molded is carried down between the cylinders. The tamper solidifies and fills the cavities at every revolution, and reaching finally the contingent point of the two cylinders, the contents of two cavities come together, and the mold is complete, as shown at P P. These molds fall upon a screen, $S^2$, or inclined plane, whence they are taken to any point desired. In this manner the coal-dust concrete is so successfully compressed and molded that the necessity for ovens for drying the molded coal is avoided.

This machine can be operated either by hand or steam power, and on any scale of magnitude desired.

I claim—

1. The tamper T, operated by the rods R R and eccentrics $x\ x$, attached to gearing, in combination with cylinders $M^1 M^2$, by which pressure is exerted on contents of hopper H equal to the driving power, for the purpose described.

2. The operating devices for compressing and molding coal-dust concrete, consisting of cylinders $M^1 M^2$, having cavities $a\ a$ and elevations $e\ e$, hopper H, and tamper T, the whole constructed and operated in the manner and for the purpose I have described.

J. R. HAYES, M. D.

Witnesses:
S. D. LAW,
A. T. GURLITZ.